(12) United States Patent
Howland

(10) Patent No.: US 11,333,465 B2
(45) Date of Patent: May 17, 2022

(54) CAMOUFLAGE COVER HAVING A VISUAL APPEARANCE AND VISIBLE AND IR SPECTRAL SIGNATURES THAT CLOSELY MATCH A VEGETATIVE ENVIRONMENT

(71) Applicant: Warwick Mills, Inc., New Ipswich, NH (US)

(72) Inventor: Charles A Howland, Temple, NH (US)

(73) Assignee: Warwick Mills, Inc., New Ipswich, NH (US)

(*) Notice: Subject to any disclaimer, the term of this patent is extended or adjusted under 35 U.S.C. 154(b) by 0 days.

(21) Appl. No.: 16/868,726

(22) Filed: May 7, 2020

(65) Prior Publication Data

US 2020/0355470 A1      Nov. 12, 2020

Related U.S. Application Data

(60) Provisional application No. 62/844,319, filed on May 7, 2019.

(51) Int. Cl.
*F41H 3/02* (2006.01)
*B32B 5/02* (2006.01)
(Continued)

(52) U.S. Cl.
CPC .............. *F41H 3/02* (2013.01); *B32B 5/022* (2013.01); *B32B 23/10* (2013.01); *B32B 27/12* (2013.01);
(Continued)

(58) Field of Classification Search
None
See application file for complete search history.

(56) References Cited

U.S. PATENT DOCUMENTS

| 3,486,177 A | 12/1969 | Marshack |
| 4,712,594 A | 12/1987 | Schneider |

(Continued)

FOREIGN PATENT DOCUMENTS

| EP | 0982801 A2 | 3/2000 |
| EP | 0742095 B1 | 2/2002 |
| JP | 2000167963 A | 6/2000 |

OTHER PUBLICATIONS

International Search Report and Written Opinion for Appl No. PCT/US2017/050467 dated Dec. 19, 2017, 15 pages.

(Continued)

*Primary Examiner* — Laura C Powers
(74) *Attorney, Agent, or Firm* — Maine Cernota & Rardin

(57) ABSTRACT

A camouflage cover that is simple to deploy and store and is robust to all weather conditions and storage cycles provides a close visual match and close visible and IR spectral signature matches to surrounding vegetation. The cover incorporates a mixture of SAP and cellulose pulp containing approximately 90% water laminated between opaque, non-woven Tencel™ layers to emulate the spectral signature of leaves. Outer polymer film layers prevent water evaporation of the SAP. Organic dye-printed patterns can be applied to one or more of the Tencel™ and film layers. The SAP mixture can be limited to leaf regions of the cover, whereby branch regions include cellulose but not SAP. The cover can be petalized by cuts made, for example, along leaf and branch region boundaries. A gloss-controlling aerogel coating can be applied to outer surfaces of the camouflage cover to match a gloss of the vegetation.

20 Claims, 2 Drawing Sheets

(51) Int. Cl.
  *B32B 37/15* (2006.01)
  *B32B 27/12* (2006.01)
  *B32B 27/36* (2006.01)
  *B32B 23/10* (2006.01)
  *D06N 3/00* (2006.01)
  *D06N 3/12* (2006.01)

(52) U.S. Cl.
  CPC ............. *B32B 27/36* (2013.01); *B32B 37/15* (2013.01); *D06N 3/0011* (2013.01); *D06N 3/12* (2013.01); *B32B 2255/02* (2013.01); *B32B 2255/26* (2013.01); *B32B 2262/04* (2013.01); *B32B 2307/414* (2013.01); *B32B 2307/7265* (2013.01); *D06N 2201/042* (2013.01)

(56) References Cited

U.S. PATENT DOCUMENTS

| | | | |
|---|---|---|---|
| 4,982,959 | A | 1/1991 | Rudell |
| 5,445,863 | A | 8/1995 | Slagle et al. |
| 5,511,536 | A | 4/1996 | Bussey, Jr. |
| 5,516,338 | A * | 5/1996 | Pai .......................... C09B 57/10 |
| | | | 8/485 |
| 5,755,275 | A | 5/1998 | Rose |
| 5,799,600 | A | 9/1998 | Reuben |
| 6,093,475 | A | 7/2000 | Gellar |
| 6,371,977 | B1 | 4/2002 | Bumgarner et al. |
| 6,586,083 | B1 | 7/2003 | Weiss, Jr. et al. |
| 8,209,785 | B2 | 3/2012 | Underwood et al. |
| 9,276,324 | B2 | 3/2016 | Kelsey et al. |
| 2004/0162536 | A1 | 8/2004 | Becker |
| 2004/0213982 | A1 | 10/2004 | Touzov |
| 2008/0057807 | A1 * | 3/2008 | Tutterow .................. D04H 1/42 |
| | | | 442/1 |
| 2009/0252913 | A1 | 10/2009 | Cincotti et al. |
| 2010/0288116 | A1 | 11/2010 | Cincotti et al. |
| 2012/0148797 | A1 | 6/2012 | Tsai |
| 2014/0304883 | A1 | 10/2014 | Morag et al. |
| 2017/0002488 | A1 | 1/2017 | Tanaka et al. |
| 2017/0203479 | A1 | 7/2017 | Laurin et al. |
| 2018/0055118 | A1 | 3/2018 | Hafeez-Bey |
| 2018/0066922 | A1 | 3/2018 | Howland |
| 2019/0168486 | A1 | 6/2019 | Min et al. |
| 2020/0080241 | A1 | 3/2020 | Ray et al. |

OTHER PUBLICATIONS

Extended European Search Report for Application No. 17849525.5 dated Feb. 26, 2020, 6 pages.
International Preliminary Report on Patentability for Appl No. PCT/US2017/050467 dated Mar. 12, 2019, 10 pages.
"Learning Express Fiil-n-Fun Water Play Mat" (https://learningexpress.com/fill-n-fun-water-play-mat/) via Internet Wayback Machine https://web.archive.org/web/20150928220409/https:learningexpress.com/fill-n-fun-water-play-mat (Year: 2015).
Art 3d Colorful Dance Floor May Liquid Encased Floor Tile https://www.srt3d.com/designs/a11004-colorful-dance-floor-mat-liquid-encased-floor-tile-50cmx50cm/ (Review dated Mar. 11, 2016) (Year: 2016).
"Infantino Pat and Play Water Matt" (https://infantino.com/products/pat-play-water-mat) via Internet Wayback Machine https://web.archive.org/web/20150905143504/https://Infantino.com/products/pat-play-water-mat circa Sep. 5, 2015 (Year: 2015).
American Plating Company ("The 5 Most Conductive Metals on Earth Are. . ." http://www.americanplatingcompany.com/most-conductive-metals/, via Internet Wayback Machine May 12, 2016 (Year: 2016).
Smith ("What is PET?" by Johanna Smith, Huffpost 2008, https://www.huffpost.com/entry/what-is-pet_n_139440 (Year: 2008).
Jane ("Material Matters: Cotton Canvas" by Adam Jane, Aug. 10, 2016 https://www.sneakerfreaker.com/articles/material-matters-cotton-canvas/) (Year: 2016).
Notice of Allowance for U.S. Appl. No. 16/832,533 dated Jun. 23, 2021, 11 pages.
Office Action for U.S. Appl. No. 16/832,533, dated Feb. 19, 2021, 18 Pages.
International Search Report and Written Opinion for PCT Appl. No. PCT/US2020/031767, dated Aug. 20, 2020, 13 Pages.
International Search Report and Written Opinion for PCT Appl. No. PCT/US2020/025230, dated Jul. 21, 2020, 12 Pages.
International Preliminary Report on Patentability for Appl. No. PCT/US2020/025230 dated Oct. 7, 2021, 8 Pages.

* cited by examiner

CAMOUFLAGE COVER HAVING A VISUAL APPEARANCE AND VISIBLE AND IR SPECTRAL SIGNATURES THAT CLOSELY MATCH A VEGETATIVE ENVIRONMENT

RELATED APPLICATIONS

This application claims the benefit of U.S. Provisional Application No. 62/844,319, filed May 7, 2019, which is herein incorporated by reference in its entirety for all purposes.

FIELD OF THE INVENTION

The invention relates to camouflage, and more particularly, to camouflage that protects assets from visual and spectral detection.

BACKGROUND OF THE INVENTION

Camouflage, which can be broadly defined as apparatus and methods for protecting covert mobile and stationary assets from detection, is an important requirement for many civilian and military applications. Current approaches to camouflage, also known as "signature management," that are used to shield vehicles and other mobile and stationary ground-based assets typically include a camouflage cover that extends over the ground-based asset and presents colors and marking patterns that attempt to match colors and patterns in the visual background. In addition, materials can be selected for the cover that emulate the relative gloss and specular properties of the surrounding environment.

Often, so-called "garnish" features are also included in the camouflage cover, where the term "garnish" refers to any feature that attempts to emulate the texture of the surrounding environment, especially the texture of leaves and other vegetation. Garnish can include "virtual" garnish, such as printed fabric or nets that generate the appearance of a texture with a depth of shadow created beneath it. The garnish effect can also include "physical" garnish such as artificial folds and/or flaps of fabric, referred to herein as "petalization," that is added to or imposed onto the fabric or nets of the camouflage cover. Such physical garnish can be highly effective in removing flat specular surfaces and/or providing self-shadowing and an appropriate range of reflectance that simulates vegetation.

However, as commercially available IR detecting instrumentation has grown smaller and costs have been reduced, it has become practical to employ sophisticated analysis of the IR spectral signature of the environment as well as the visible signature when seeking to detect camouflaged assets. As a result, in a growing number of hostile situations it is no longer sufficient for camouflage to simply match the surrounding colors and visual patterns, because hostile forces are able to use this new instrumentation to detect differences and variations in both the visible and infrared ("IR") absorptions and emissions in a scene as a function of visible and IR wavelength. This "spectroscopic" approach to defeating camouflage is sensitive to differences in the chemical makeup of the scene, and not simply to visible colors and energy emission levels. For this reason, it is becoming increasingly important for camouflage to emulate the chemical, "spectral" signature of the surrounding environment.

Typically, the amount of water by weight in plant vegetation is between 90% and 95% with the remainder being a combination of biochemical components. Since water is transparent in the visible range, the visible appearance of vegetation is mainly dominated by the biochemical components that are present in the upper surfaces of leaves and other plant structures. These biochemical components also contribute to the IR spectral signature of the vegetation. In addition, the IR signature of vegetation is also strongly affected by the water that is included in the vegetation.

Further discussion regarding components of the spectral signature of vegetation can be found in co-pending application U.S. Ser. No. 15/698,134, also by the present inventor, which is included herein by reference in its entirety for all purposes.

One approach to addressing multi spectral detection threats is to harvest live vegetation from the surrounding environment and dress assets with the live vegetation on a daily basis. However, this approach is labor intensive and time consuming, and can destroy or otherwise disturb the local fauna in ways that are atypical of an undisturbed environment, and thereby increase the likelihood of detection.

Another approach is to circulate water, possibly mixed with organic dyes to form a bio-chromophore dye solution, through a vascular system included in the camouflage cover. This approach can provide a visible and IR spectral match to a surrounding environment that is flexible and can be adapted as the environment changes, for example when protecting mobile assets and/or responding to changes in temperature or weather conditions. However, this approach has the disadvantage of significant field complexity, in that the system is complex to set up and take down, and requires significant support apparatus and supplies, including liquid circulation equipment and a supply of dye solution to replace solution that is evaporated during use. This field complexity can be a burden, especially when the adaptable features of the system are not required because the visible and IR spectral signature of the environment are not undergoing significant variations over time. In addition, this approach can become problematic if temperatures fall below freezing, such that it becomes necessary to warm the dye solution and/or to add an anti-freeze substance to the dye solution that may interfere with its chemical and spectral properties.

What is needed, therefore, is a camouflage system that provides both a close visual match and a close visible and IR spectral signature match to a surrounding, vegetation-rich environment, and which is simple to deploy and store, does not require support apparatus or supplies such as pumps and dye solutions, and readily survives freeze and storage cycles.

SUMMARY OF THE INVENTION

The present invention is a camouflage system that provides both a close visual match and a close visible and IR spectral signature match to a surrounding vegetation-rich environment, and which is simple to deploy and store, does not require support apparatus or supplies such as pumps and dye solutions, and is robust to all weather conditions and storage cycles. The invention is suitable for use in environments where the visible and IR spectral signature of the environment does not undergo significant variations over time.

As noted above, typical leaf vegetation is composed of between 90% and 95% water, which has a strong effect on the IR spectral signature of the vegetation. The present invention matches the water IR signature of vegetation by incorporating a water-saturated super-absorbent polymer (SAP) that is mixed with a cellulose pulp. This SAP mixture includes about 90% water (by weight), thereby emulating the water content of leaves, while the cellulose pulp in the mixture chemically emulates branches and other natural components of vegetation. It should be noted that the terms "super-absorbent polymer" and "SAP" are used herein to refer to a polymer that can absorb at least 200 times its weight in distilled water.

The SAP mixture is sandwiched between upper and lower cellulosic layers that further support the spectral match to vegetation and, in embodiments, provide opacity. In embodiments, the cellulosic layers are layers of a non-woven Lyocell fabric, which support the spectral match to vegetation since Lyocell is made from a cellulosic fiber obtained from cotton or wood pulp. The cellulosic layers are sometimes referred to herein as Tencel™ layers. However, it will be understood that unless otherwise required by context, references to Tencel™ should be interpreted to refer to any form or brand of Lyocell. So as to avoid slow evaporation of water from the SAP mixture, the SAP/Tencel™ assembly is sandwiched between upper and lower water barriers. In embodiments, each of these water barriers includes one or more film layers formed from a polymer such as PET, nylon, aliphatic urethane, polyether urethane, poly-chloro-tri-fluoro-ethylene (PCTFE), or HDPE (High Density PolyEthylene, for example having a density of 0.95-0.965). For example, embodiments include upper and lower (outer) layers of nylon and/or polyethylene terephthalate (PET) film.

One or more inks and/or dyes are applied to at least one layer of the camouflage assembly so as to provide a visual match to the surrounding environment. These can include application of one or more inks and/or dyes to an outward-facing surface of at least one of the cellulosic layers, and/or application of one or more inks and/or dyes to one or more of the water barrier layers. The inks and/or dyes can be applied in various combinations of colors and patterns, which can be different on each side of the camouflage assembly, so that one or the other combination of colors and patterns is visible depending on the orientation in which the camouflage assembly is deployed. This feature provides a limited degree of adaptability to the visible appearance of the camouflage cover.

In embodiments, at least one of the water barrier layers is formed from a dye-accepting polymer such as PET or cellulose acetate, EVO, polyimide, polyethylene, polypropylene, and/or polycarbonate. Embodiments include a plurality of film layers that are selected so as to facilitate dye compatibility, increase resistance to UV-induced color changes, and improve wet bond strength. In embodiments, at least one of the film layers is printed with a pattern that makes use of disperse dyes that are applied to the film using a dye sublimation process to transfer the pattern to the film.

In embodiments, the ink(s) and/or dye(s) that are applied to at least one of the layers of the camouflage cover are direct organic dyes that do not contain inorganic pigments. This use of only organic pigments improves the spectral match of the camouflage cover to surrounding vegetation, because the three main colorants that are present in leaves are all organic chromophores.

In various embodiments, at least some of the adjacent layers of the camouflage cover assembly are adhesively bound to each other. The applied adhesives can include polyether or aliphatic Thermo-Plastic Urethane (TPU), polyether or aliphatic polyurethane, SBR, acrylic and/or other polymers and blends. In embodiments, at least one of the adhesives has low moisture vapor transmission, good color stability in sunlight, and/or resistance to water attach by hydrolysis.

In embodiments, the SAP mixture of the present invention is not affected by freeze and thaw cycles and does not support mold or bacterial growth. Moisture loss through the water barrier layers is very slow, and in embodiments is less than 10 g/m2/month. However, for long term storage, embodiments are further sealed within a polymeric foil packaging, as is known in the food wrap industry, whereby the water loss is less than one percent per year.

In embodiments, the camouflage cover assembly includes "leaf" regions and "branch" regions, wherein the "leaf" regions include the SAP mixture sandwiched between the cellulosic and water barrier layer, as described above, while the "branch" regions only include only the cellulosic material and polymer film or other water barrier layers, and do not include the SAP mixture. In some embodiments, the camouflage is petalized by making cuts in the assembly, and in embodiments that include branch and leaf regions, the cuts can be made along the borders of the leaf and branch regions so as to create a leaf and branch design, wherein the bonding area fret work between the leaf and branch regions is removed from the layup.

Various embodiments further include features that control the gloss and specular reflection of the camouflage cover. These features can include an outer coating that imparts a low gloss to the camouflage cover which is a perfect match for vegetation gloss in both the visible and IR spectral regions. Embodiments can further include additional scrim layers and/or printed textile layers having gloss and specular reflection properties that are adjusted to match the background vegetation.

Spectral vs diffuse reflectance measurements made according to ASTM D523-14 (coated film optical properties) taken using a Novo-Gloss MultiGauge Lite from Rhopoint Instruments provided the following results:

85 deg incidence=<5 gloss units
60 deg incidence=<5 gloss units
20 deg incidence=<5 gloss units A first general aspect of the present invention is a camouflage cover configured to provide a spectral signature that is a match to a vegetative environment in the visible and IR spectral regions. The camouflage cover includes an upper cellulosic layer formed from a first cellulosic fabric, a lower cellulosic layer formed from a second cellulosic fabric, an SAP layer sandwiched between the upper and lower cellulosic layers, the SAP layer comprising a mixture of a super-absorbent polymer, a cellulose pulp, and water, the upper and lower cellulosic layers having outer sides that face away from the SAP layer, and upper and lower water boundary layers configured to prevent escape of the water of the SAP layer from the camouflage cover.

In embodiments, at least one of the first and second cellulosic fabrics is a non-woven Tencel™ fabric.

In any of the above embodiments, at least one of the water boundary layers can be a polymer film layer applied to the outer side of one of the cellulosic layers. In some of these embodiments, the polymer film layer includes at least one of PET, nylon, cellulose acetate, EVO, polyimide, polyethylene, polypropylene, and polycarbonate.

Any of the above embodiments can further include a first printed pattern applied to at least one of the outer side of the upper cellulosic layer and the upper water boundary layer. In some of these embodiments, the printed pattern includes at least one of an organic ink and an organic dye. Any of these embodiments can further include a second printed pattern applied to at least one of the outer side of the lower cellulosic layer and the lower water boundary layer. In some of these embodiments the first and second printed patterns differ from each other. And in any of these embodiments at least one of the water boundary layers can include a translucent printed pattern applied thereto.

Any of the above embodiments can further include an aerogel coating applied to an outermost surface of the camouflage cover, said aerogel coating being configured to match a gloss of the camouflage cover to a gloss of the vegetative environment.

In any of the above embodiments, approximately 90% of a weight of the SAP layer can be contributed by the water of the SAP layer.

In any of the above embodiments, the camouflage cover can include cuts that create petalization of the camouflage cover.

In any of the above embodiments, the SAP layer can be located only in leaf regions of the camouflage cover, and the camouflage cover can further include branch regions that do not include the SAP layer. In some of these embodiments the branch regions include all of the layers that are included in the leaf regions excepting the SAP layer. And if cuts that create petalization are included, the cuts can follow boundaries between the leaf regions and the branch regions.

In any embodiments that include branch and leaf regions, and that include a printed pattern, the printed pattern can include distinct printed features that correspond with the leaf and branch regions respectively.

Any of the above embodiments can further include, exterior to one of the cellulosic layers, at least one of a scrim layer and a printed textile layer.

A second general aspect of the present invention is a method of manufacturing a camouflage cover configured to provide a spectral signature that is a match to a vegetative environment in the visible and IR spectral regions. The method includes the following steps:

A) preparing first and second cellulosic layers and first and second water barrier layers;
B) applying patterns to an outer surface of at least one of the first cellulosic layer, the second cellulose layer, the first water barrier layer and the second water barrier layer;
C) laminating the first water barrier layer to an outer side of the first cellulose layer, and laminating the second water barrier layer to an outer side of the second cellulose layer;
D) preparing an SAP mixture, said SAP mixture being a mixture of a super-absorbent polymer, cellulose pulp, and water;
E) applying the SAP mixture to an inner side of the first cellulosic layer; and
F) laminating the second cellulosic layer to the first cellulosic layer, such that the SAP mixture is sandwiched therebetween, and such that the first and second water barrier layers are configured to prevent escape of the water of the SAP layer from the camouflage cover.

In embodiments, the patterns applied in step B) are applied using only at least one of organic inks and organic dyes.

In any of the above embodiments, the patterns applied in step B) can be applied using digital printing.

In any of the above embodiments, the patterns applied in step B) can include a translucent pattern applied to one of the water barrier layers.

In any of the above embodiments, the camouflage cover can include leaf regions and branch regions, and the SAP mixture can be present only in the leaf regions. In some of these embodiments the patterns applied in step B) include distinct leaf patterns applied to the leaf regions and branch patterns applied to the branch regions.

Any of the above embodiments can further include cutting the assembled SAP layer, first and second cellulosic layers and first water boundary layer, thereby forming petalizations. And for any of the above embodiments that includes leaf and branch regions, the cutting can be along boundaries between the leaf and branch regions.

Any of the above embodiments can further include applying an aerogel coating to an outer side of at least the first water barrier layer, thereby controlling a gloss of the camouflage cover so as to match a gloss of the vegetative environment.

And in any of the above embodiments, the laminating in at least one of steps D, E, and F can be implemented using a wet marry process.

In embodiments where, at most, only one "top" side of the camouflage cover includes visual camouflage formed by inks and dyes, a passive heat barrier layer can be included as a bottom, inner layer of the camouflage cover so as to mask the infrared heat signature of protected assets. In other embodiments, an independent, passive or active heat barrier is deployed below the camouflage cover of the present invention.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a camouflage system that provides both a close visual match and a close visible and IR spectral signature match to a vegetation-rich background environment. The disclosed invention is a camouflage cover that is simple to deploy and store, does not require exotic support apparatus or supplies such as pumps and dye solutions, and is robust to all weather conditions and storage cycles. The invention is suitable for use in environments where the visible and IR spectral signature of the environment does not undergo significant variations over time, although embodiments are reversible and thereby can provide two different visual appearances.

Typically, the amount of water by weight in plant vegetation is between 90% and 95%, which has a strong effect on the IR spectral signature of the vegetation. For that reason, the present invention incorporates large quantities of water within the camouflage cover, so as to emulate the natural water IR signature of leaves. Natural vegetation also includes cellulose and other organic chromophores that affect both the visible and IR signature of the environment. Accordingly, the present invention further includes cellulose and organic dyes that emulate these contributions to the visible and IR spectral signatures of vegetation.

In addition, embodiments of the present invention include printed patterns, physical petalization, and gloss-adjusted coatings that further help to match the gloss and specular reflection properties of vegetation. Embodiments are divided into "leaf" regions that include both water and cellulose, and "branch" regions that include cellulose but not water. These leaf and branch regions respectively emulate the visible and IR signatures of leaves and branches included in vegetation.

Figure 1:
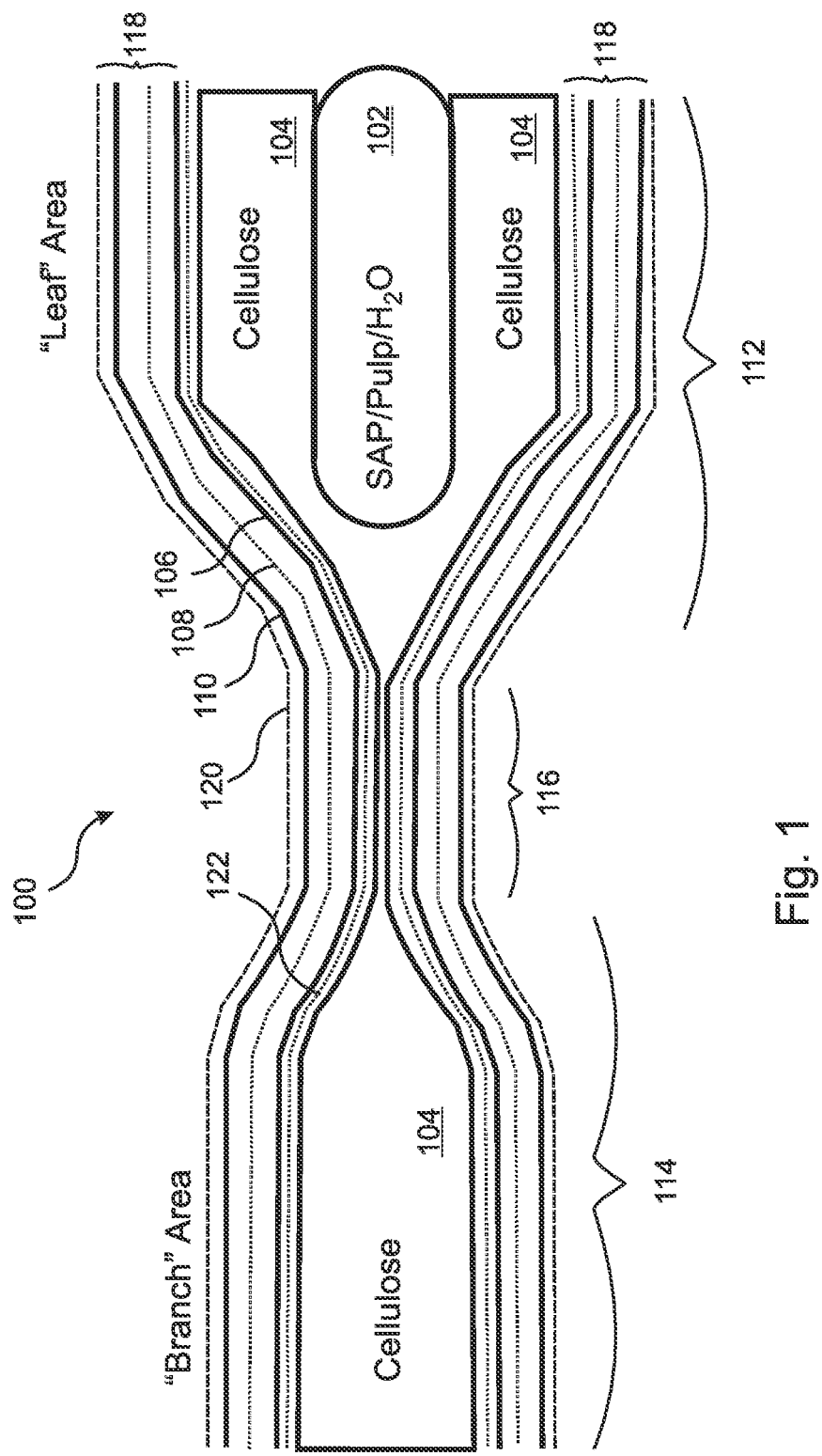
FIG. 1 is a cross-sectional drawing that illustrates an embodiment of the present invention.

With reference to FIG. 1, the camouflage cover 100 of the present invention includes a water-saturated super-absorbent polymer (SAP) that is mixed with a cellulose pulp. This SAP mixture 102 includes about 90% water (by weight), which emulates the water content of leaves, while the cellulose pulp in the mixture 102 chemically emulates the cellulosic component of leaves, branches, and other elements of vegetation. It should be noted that the terms "super-absorbent polymer" and "SAP" are used herein to refer to a polymer that can absorb at least 200 times its weight in distilled water.

The SAP mixture 102 is sandwiched between upper and lower cellulosic layers 104 that further support the spectral match to vegetation. The cellulosic layers 104 can provide opacity, and can be layers of a non-woven Lyocell fabric, since Lyocell is made from a cellulosic fiber obtained from cotton or wood pulp. The thickness of the SAP mixture 102 can be adjusted to provide a match to the surrounding environment.

So as to avoid slow evaporation of water from the SAP mixture 102, the SAP/cellulosic assembly 102, 104 is sandwiched between upper and lower water barriers 118. In embodiments, each of these water barriers 118 includes one or more film layers 106, 110 formed from one or more polymers such as PET, nylon, aliphatic urethane, polyether urethane, poly-chloro-tri-fluoro-ethylene (PCTFE), or HDPE (High Density PolyEthylene, for example having a density of 0.95-0.965). For example, embodiments include upper and lower (outer) layers 110 of nylon and/or polyethylene terephthalate (PET) film.

One or more inks and/or dyes (not shown) can be applied to at least one layer of the camouflage assembly so as to provide a visual match to the surrounding environment. These can include application of one or more inks and/or dyes to an outward-facing surface of at least one of the cellulosic layers 104, and/or application of one or more inks and/or dyes to one or more of the water barrier layers 106, 110. The inks and/or dyes can be applied in various combinations of colors and patterns, which can be different on each side of the camouflage assembly 100, so that one or the other combination of colors and patterns is visible depending on the orientation in which the camouflage assembly is deployed. This feature provides a limited degree of adaptability to the visible appearance of the camouflage cover.

In embodiments, at least one of the water barrier layers 106, 110 is formed from a dye-accepting polymer such as PET or cellulose acetate, EVO, polyimide, polyethylene, polypropylene, and/or polycarbonate. Embodiments include a plurality of film layers 106, 110 that are selected so as to facilitate dye compatibility, increase resistance to UV-induced color changes, and improve wet bond strength. In embodiments, at least one of the water barrier layers 106, 110 is printed with a pattern that makes use of disperse dyes that are applied to the water barrier layer using a dye sublimation process to transfer the pattern to the layer.

In embodiments, the ink(s) and/or dye(s) that are applied to at least one of the layers 104, 106, 110 are direct organic dyes that do not contain inorganic pigments. This use of only organic pigments improves the spectral match of the camouflage cover to surrounding vegetation, because the three main colorants that are present in leaves are all organic chromophores.

In various embodiments at least some of the adjacent layers 106, 110 of the camouflage assembly 100 are bound to each other by an adhesive 108. The applied adhesives 108 can include polyether or aliphatic Thermo-Plastic Urethane (TPU), polyether or aliphatic polyurethane, SBR, acrylic and/or other polymers and blends. In embodiments, at least one of the adhesives has low moisture vapor transmission, good color stability in sunlight, and/or resistance to water attach by hydrolysis.

Various embodiments further include features that control the gloss and specular reflection of the camouflage cover 100. These features can include an outer coating 120 that imparts a low gloss to the camouflage cover 100 which is a close match to vegetation gloss in both the visible and IR spectral regions. Embodiments can further include additional scrim layers and/or printed textile layers (not shown) having gloss and specular reflection properties that are adjusted to match the background vegetation.

In some embodiments the water barrier 118 includes the following structural elements:
  Gloss control layer 120 with Aerogel filler in an aliphatic urethane binder
  Disperse dye layer (not shown—applied to layer 110)
  PET or Cellulose acetate dye compatible layer 110
  adhesive layer, (UV resistant urethane, acrylic or other compatible adhesive) 108
  HDPE moisture control layer 106
  Adhesive layer 122 (polyether urethane, acrylic or other moisture stable bonding agent)
  Tencel™ fiber layer 104

In embodiments, the SAP mixture 102 of the present invention is not affected by freeze and thaw cycles, and does not support mold or bacterial growth. Moisture loss through the cellulosic and water barrier layers is very slow. However, for long term storage, embodiments 100 are further sealed within a polymeric foil packaging (not shown), as is known in the food wrap industry, whereby the water loss is less than one percent per year.

In embodiments, the camouflage assembly 100 includes "leaf" regions 112 and "branch" regions 114, wherein the "leaf" regions 112 include the SAP mixture 102 sandwiched between the cellulosic layers 104 and the water barriers 118, as described above, while the "branch" regions 114 only include Tencel™ 104 or similar cellulosic layers 104 sandwiched between the water barriers 118, but do not include the SAP mixture 102.

Figure 2:
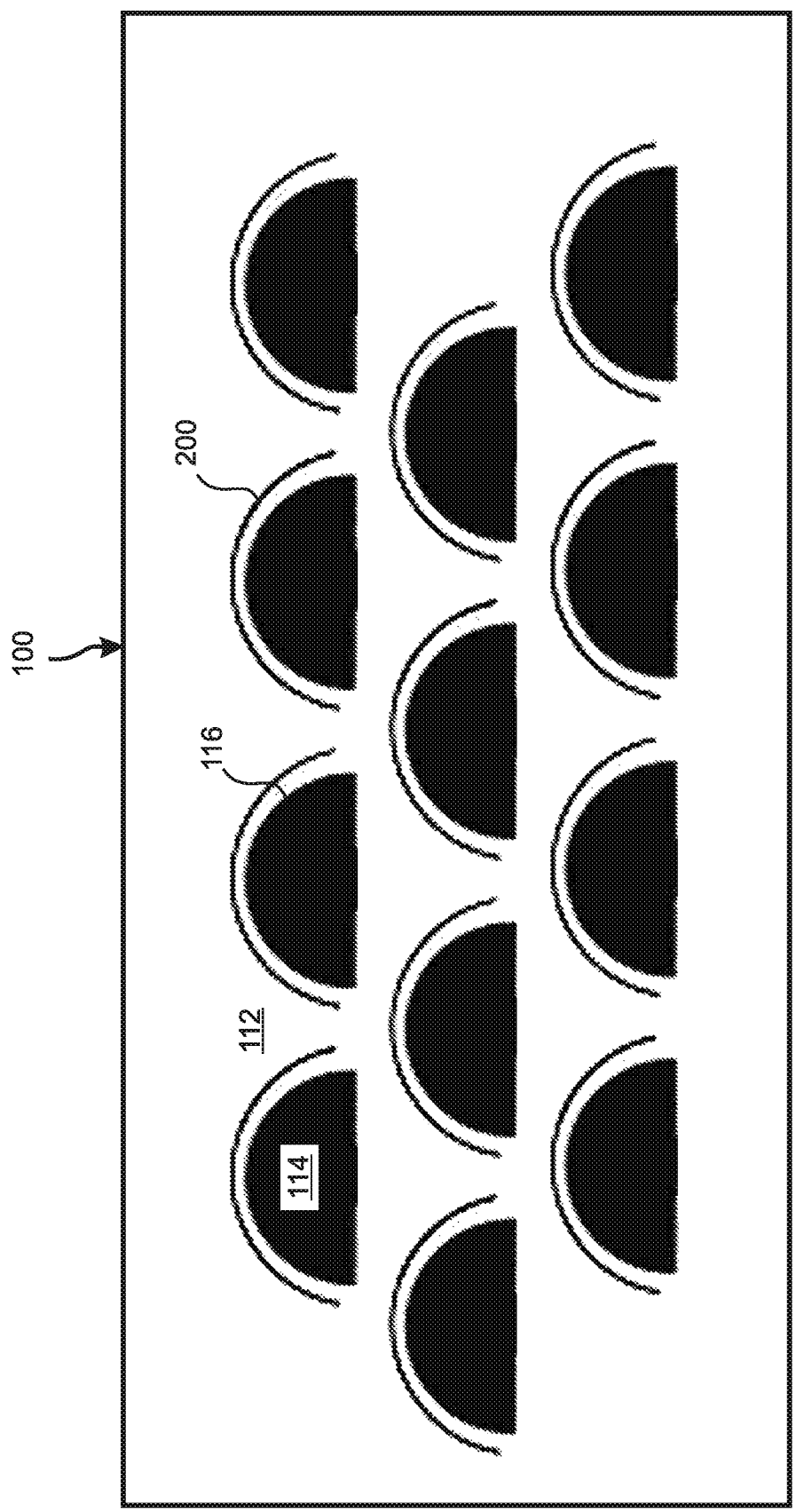
FIG. 2 is a top view of an embodiment that includes cuts that follow borders between leaf and branch regions, where the cuts create petalization in the camouflage cover.

With reference to FIG. 2, in some embodiments, the camouflage cover is petalized by making cuts 200 in the assembly. In the embodiment of FIG. 2, which includes leaf 112 and branch 114 regions, the cuts 200 are made along the borders 116 of the leaf 112 and branch 114 regions so as to create a leaf and branch design, wherein the bonding area fret work between the leaf 112 and branch 114 regions is removed from the layup 100.

Embodiments further include additional scrim layers and/or printed textile layers (not shown) having gloss and specular reflection properties that are adjusted to match the background vegetation.

Exemplary embodiments can be manufactured according to the following sequence of steps:
  1. First and second Tencel™ layers 104 are printed with selected patterns using organic inks. The printed patterns include "leaf" regions 112 and "branch" regions 114.

2. First and second film layers 106 are prepared by printing select patterns with a translucent, organic dye onto the film layers 106.
3. The printed first and second Tencel™ layers 104 are each laminated on one side to a corresponding film layer 106 using an adhesive 122.
4. The SAP mixture 102 is separately prepared, and applied to the leaf regions 112 of the first Tencel™ layer 104 on the side opposite to the laminated water barrier 118.
5. The second Tencel™ layer 104 is laminated to the SAP mixture 102, such that the laminated water barriers 118 are on the outer sides of the resulting "core sandwich."
6. A first side of the core sandwich is tack-welded to a first nylon or PET film layer 110 using an adhesive 108, and the resulting assembly is cut by an automated digital cutting system along the boundaries 116 of the leaf 112 and branch 114 regions, whereby the bonding and fret work are removed. Because both the printing and cutting are performed by digitally controlled devices, the printed patterns can be customized according to the specific pattern of vegetation where the camouflage cover 100 will be deployed, and the cutting can be customized to conform to the printed pattern.
7. In a final laminate pass that also uses a wet-marry process rather than a thermal process (so as to preserve the water content of the SAP mixture 102), a second nylon or PET film layer 110 is applied by an adhesive 108, such that the two nylon or PET film layers 110 are on opposing outer sides of the camouflage cover 100. Additional scrim layers and/or textile layers are added as needed for increased pattern and garnish alternatives.
8. An aerogel coating 120 is applied to outer surfaces of the camouflage cover 100 as gloss control agents, whereby the coating 120 imparts a gloss to the camouflage cover 100 that is a substantially perfect match to the natural gloss of the surrounding vegetation in both the visible and IR spectral regions.

In embodiments where, at most, only one side of the camouflage cover 100 includes inks and/or dyes that provide visual camouflage, a passive heat barrier layer (not shown) can also be included as a bottom layer of the camouflage cover 100 so as to mask the infrared heat signature of protected assets. In other embodiments, an independent, passive or active heat barrier is deployed below the camouflage cover of the present invention.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

I claim:

1. A camouflage cover configured to provide a spectral signature that is a match to a vegetative environment in the visible and IR spectral regions, the camouflage cover comprising:
   an upper cellulosic layer formed from a first cellulosic fabric;
   a lower cellulosic layer formed from a second cellulosic fabric;
   an SAP layer sandwiched between the upper and lower cellulosic layers in a leaf region of the camouflage cover, the SAP layer comprising a mixture of a superabsorbent polymer, a cellulose pulp, and water, the upper and lower cellulosic layers having outer sides that face away from the SAP layer; and
   upper and lower water barrier layers configured to prevent escape of the water of the SAP layer from the camouflage cover;
   wherein the camouflage cover is compatible with being subjected to storage cycles.

2. The camouflage cover of claim 1, wherein at least one of the first and second cellulosic fabrics is a non-woven Lyocell fabric.

3. The camouflage cover of claim 1, wherein at least one of the water barrier layers is a polymer film layer applied to the outer side of one of the cellulosic layers.

4. The camouflage cover of claim 3, wherein the polymer film layer includes at least one of PET, nylon, cellulose acetate, EVO, polyimide, polyethylene, polypropylene, and polycarbonate.

5. The camouflage cover claim 1, further comprising a first printed pattern applied to at least one of the outer side of the upper cellulosic layer and the upper water barrier layer.

6. The camouflage cover of claim 5, wherein the printed pattern includes at least one of an organic ink and an organic dye.

7. The camouflage cover of claim 5, further comprising a second printed pattern applied to at least one of the outer side of the lower cellulosic layer and the lower water barrier layer.

8. The camouflage cover of claim 7, wherein the first and second printed patterns differ from each other.

9. The camouflage cover of claim 5, wherein at least one of the water barrier layers includes a translucent printed pattern applied thereto.

10. The camouflage cover of claim 1, further comprising an aerogel coating applied to an outermost surface of the camouflage cover, said aerogel coating being configured to match a gloss of the camouflage cover to a gloss of the vegetative environment.

11. The camouflage cover of claim 1, wherein approximately 90% of a weight of the SAP layer is contributed by the water of the SAP layer.

12. The camouflage cover of claim 1, wherein the camouflage cover includes cuts that create petalization of the camouflage cover.

13. The camouflage cover of claim 1, wherein the camouflage cover further comprises a branch region that does not include the SAP layer.

14. The camouflage cover of claim 13, wherein the branch regions include the water barrier layers surrounding at least one of the cellulosic layers.

15. The camouflage cover of claim 13, wherein the camouflage cover includes cuts that create petalization of the camouflage cover, and wherein at least some of the cuts follow boundaries between the leaf regions and the branch regions.

16. The camouflage cover of claim 13, further comprising a first printed pattern applied to at least one of the outer side of the upper cellulosic layer and the upper water barrier layer, and wherein the printed pattern includes distinct printed features that correspond with the leaf and branch regions respectively.

17. The camouflage cover of claim 1, further comprising, exterior to one of the cellulosic layers, at least one of a scrim layer and a printed textile layer.

18. A method of manufacturing a camouflage cover configured to provide a spectral signature that is a match to a vegetative environment in the visible and IR spectral regions, the method comprising:
A) preparing first and second cellulosic layers and first and second water barrier layers;
B) applying patterns to an outer surface of at least one of the first cellulosic layer, the second cellulosic layer, the first water barrier layer and the second water barrier layer;
C) laminating the first water barrier layer to an outer side of the first cellulosic layer, and laminating the second water barrier layer to an outer side of the second cellulosic layer;
D) preparing an SAP mixture, said SAP mixture being a mixture of a super-absorbent polymer, cellulose pulp, and water;
E) applying the SAP mixture to an inner side of the first cellulosic layer in a leaf region of the camouflage cover; and
F) laminating the second cellulosic layer to the first cellulosic layer, such that the SAP mixture is sandwiched therebetween in the leaf region, and such that the first and second water barrier layers are configured to prevent escape of the water of the SAP layer from the camouflage cover;
wherein the camouflage cover is compatible with being subjected to storage cycles.

19. The method of claim 18, wherein the camouflage cover includes a branch region distinct from the leaf region, and wherein the method further comprising cutting the assembled SAP layer, first and second cellulosic layers and first water barrier layer along a boundary between the leaf and branch regions, thereby forming petalizations.

20. The method of claim 18, wherein the laminating in at least one of steps D, E, and F is implemented using a wet marry process.

* * * * *